US008561162B2

(12) United States Patent
Walters

(10) Patent No.: US 8,561,162 B2
(45) Date of Patent: Oct. 15, 2013

(54) SYSTEMS AND METHODS FOR UNIFIED LOGIN TO MULTIPLE NETWORKED SERVICES

(75) Inventor: Colin Walters, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 1043 days.

(21) Appl. No.: 12/039,545

(22) Filed: Feb. 28, 2008

(65) Prior Publication Data
US 2009/0222899 A1 Sep. 3, 2009

(51) Int. Cl.
*G06F 17/30* (2006.01)

(52) U.S. Cl.
USPC ............... 726/8; 726/2; 726/5; 709/225

(58) Field of Classification Search
USPC ........................ 726/8, 2, 5; 709/225
See application file for complete search history.

(56) References Cited

U.S. PATENT DOCUMENTS

| | | | | |
|---|---|---|---|---|
| 6,701,441 B1 * | 3/2004 | Balasubramaniam et al. | . | 726/25 |
| 7,418,702 B2 * | 8/2008 | Tsao | .................................. | 718/1 |
| 7,461,265 B2 * | 12/2008 | Ellmore | ........................ | 713/183 |
| 7,475,353 B2 * | 1/2009 | Nuzzi | ............................ | 715/741 |
| 7,475,422 B1 * | 1/2009 | Bull et al. | ......................... | 726/3 |
| 7,774,612 B1 * | 8/2010 | Deutschmann et al. | ...... | 713/182 |
| 7,788,376 B2 * | 8/2010 | Tom et al. | ..................... | 709/225 |
| 7,904,947 B2 * | 3/2011 | Basner et al. | ..................... | 726/8 |
| 2009/0328169 A1 * | 12/2009 | Hutchison et al. | ................ | 726/7 |

* cited by examiner

*Primary Examiner* — Amare F Tabor
(74) *Attorney, Agent, or Firm* — Lowenstein Sandler LLP

(57) ABSTRACT

Embodiments relate to systems and methods for unified login to multiple networked services. A user operates a browser to access a Web site, such as an email portal. The user is presented with a query box to input login information such as a user name and password to view email from an email account. Upon entry of login information to the email or other site, a login manager captures the login information to automatically transmit that information to a local program and associated networked sites or services, such as messenger or media services, that accept the same login information. The login manager logs the user into that program and additional services without the user having to re-enter the same login information. The additional services can be accessed via an online desktop, and the user can configure the additional local programs or registered services via that desktop or other interface.

22 Claims, 4 Drawing Sheets

SYSTEMS AND METHODS FOR UNIFIED LOGIN TO MULTIPLE NETWORKED SERVICES

FIELD

Embodiments herein relate to systems and methods for allowing unified login to multiple network services, and more particularly to platforms and techniques that capture a user's login information from a browser and convey that information to one or more additional local programs and/or online services.

BACKGROUND OF RELATED ART

It is common for users of personal computers and other client devices to operate a Web browser to locate Web sites and other locations of interest. At many of those sites, the user may be prompted for login information such as a user name and password, or other credentials. The user can generally access and interact with the site or service after supplying valid login information. The user for example might navigate to a Web email site and be presented with a query box to enter a user name and a password, which, after they are supplied, enable the user to view and send email messages from an email account.

The user may, however, wish to access or interact with more than one local program as well as remote service during a browsing session. For example, the user might wish to log into a Web email site, retrieve email, and also activate a messenger application as well as receive streaming audio or other media, all during the same Web browsing session. These additional services can, in one regard, be accessed via an online desktop or other collaborative interface. According to known browser and related technology, the user is forced to re-enter their login information for each new site or service they wish to use. The user is inconveniently required to repeat the login process, even if the user is registered to the various programs, sites or services they wish to additionally access with the same user name and password as the initial site accessed via the Web browser. It may be desirable to provide methods and systems for unified login to multiple services in which browser login information is captured and automatically used to access, activate, or log into further local programs and/or Web sites or services without user intervention.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for unified login to multiple local programs and/or associated networked services. More particularly, embodiments related to platforms and techniques in which a user navigates to a Web site using a browser. The site can present a query dialog, such as an input box for a user name and password combination, to the user to enter login information to access a Web site or service, such as an email site or service. The user enters the login information in response to the query, and when the login information is valid, gains access to an email account, or other service. The user may for instance be directed to an inbox for the email account. The browser incorporates or operates in conjunction with a login manager which captures the entry of the initial login information to the Web site. The login manager can automatically detect, capture, and transmit the login information to one or more local programs and/or set of additional registered networked services. The local program and set of registered networked services can accept the same login information as the Web site initially visited and be accessed by the same user name, password, or other credentials or information.

The login manager can transmit the login information to the local program(s) and the set of registered networked services automatically, without a need for the user to re-enter the login information. The local program(s) and set of registered networked services can then be transparently accessed or invoked via the Internet or other network, immediately after successful login to the initial site or service. In embodiments, the set of registered services can be accessed via an online desktop that displays and manages the user's collaborative online activity. The activation and availability of the local programs(s) and set of registered networked services can be notified via a popup display, such as, for example, a messenger panel or a media player. These and other embodiments described herein address the various noted shortcomings in known login technology, and provide better coordination of Web sites, local programs and associated networked services.

Reference will now be made in detail to exemplary embodiments of the present teachings, which are illustrated in the accompanying drawings. Where possible the same reference numbers will be used throughout the drawings to refer to the same or like parts.

Figure 1:
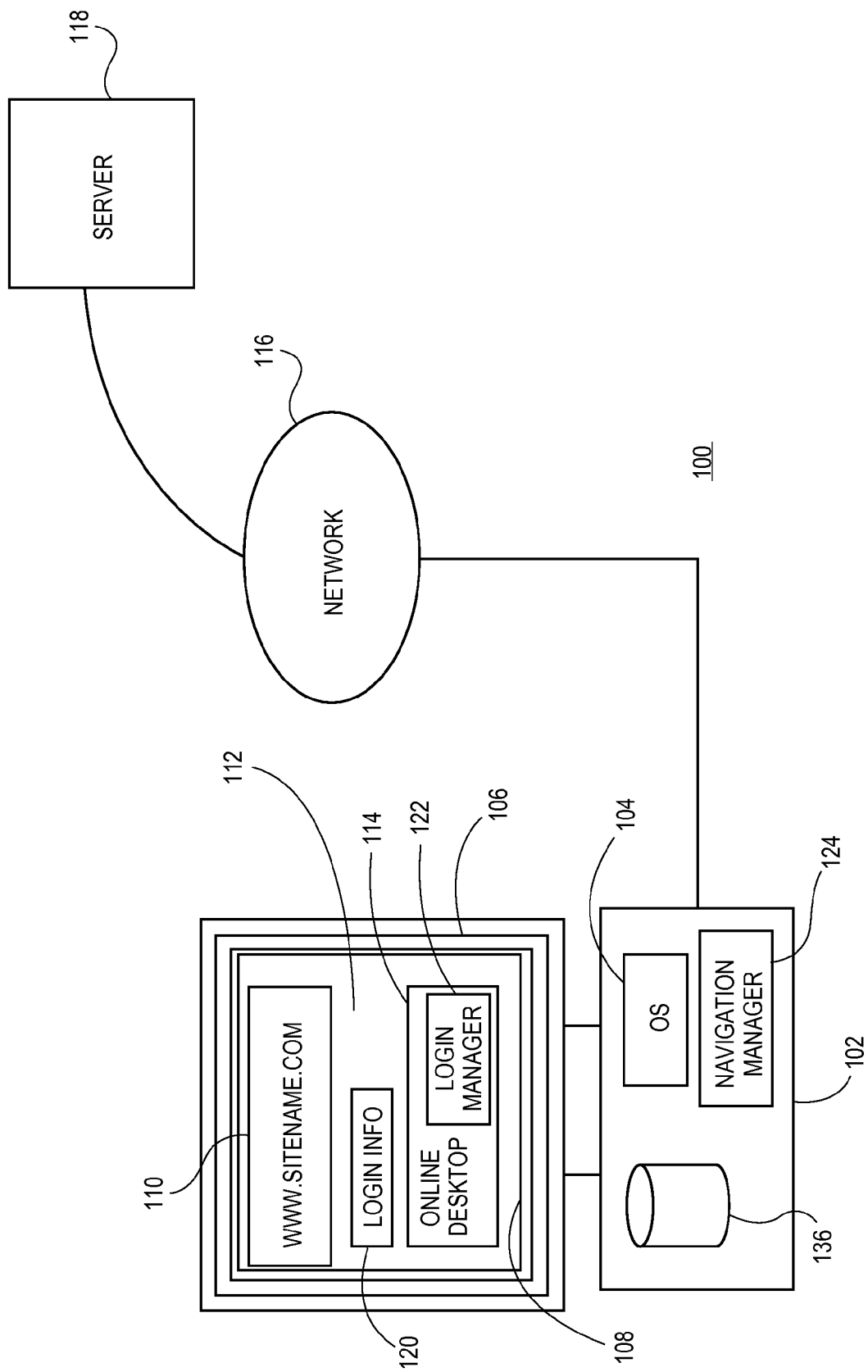
FIG. 1 illustrates an overall system for unified login to multiple programs and/or services, according to various embodiments.

FIG. 1 illustrates an overall system 100, consistent with various embodiments of the present teachings. In embodiments as shown, a user can operate a browser 108 on a client 102 to navigate or browse to a site 112 via a network 116. Browser 108 can be a Web browser, such as the Firefox™, Opera™, or other open-source or proprietary browser application. Site 112 can be identified by a uniform resource locator (URL) 110, which can be in http://www.sitename.com format. In embodiments, other types or formats of site addressing or identification can be used. Network 116 can be or include the Internet, or other public or private networks. Site 112 can be hosted by a site server 118, such as a Web server.

Client 102 can host and run under control of an operating system 104, such as a distribution of the Linux™ operating system, the Unix™ operating system, or other open-source or proprietary operating system. Operating system 104 can present and manage a user interface 106 to accept user inputs and commands. User interface 106 can be or include a graphical user interface, a command line interface, a voice-activated or touch-screen interface, or other interface. Client 102 can contain or access resources including a data store 136, such as a local database stored on a hard drive or other storage.

Client 102 can execute an online desktop 114 within operating system 104. Online desktop 114 can be an interface, application or tool that organizes and manages a user's interaction with local and remote resources, including other users, remote files, applications and Web services. Online desktop 114 more particularly is configured to interact with browser 108 to detect, capture, manage and transmit or exchange login information 120 used by the user to access one or more site 112.

In general, the user operates browser 108 to browse or navigate to one or more site 112. The user can manually type in or enter a URL 110 for each site they wish to view or visit, or can select links on a given site 112 that embeds a further URL 110 in hyper text markup language (HTML), or can otherwise navigate from one site to another. In embodiments, the user can operate client 102 to or open or browse multiple sites at one time through multiple running instances of browser 108.

Client 102 further contains or hosts a login manager 122 to capture, record and manage a set of login information 120 entered by the user to log into or access a site 112 and/or access its related services. Login information 120 can be or include user name, password, account number, or other credentials or information used to authenticate a user to access a site 112 and use its associated services or data store. Login information 120, can, for one illustrative example, include a users account name or identifier along with a required password. Login information 120 can, as another illustrative example, include a users account number and password. Login information 120 can include additional or other types of data used to identify a user and verify their access privileges. In embodiments, for example, login information 120 can include biometric information for a user, such as a retinal scan or thumbprint reading.

Login manager 122 can be integrated in online desktop 114, as part of the logic of that component or resource. In embodiments, login manager 122 can be embedded in other software or resources, for instance in operating system 104, in browser 108, or elsewhere.

Figure 2:
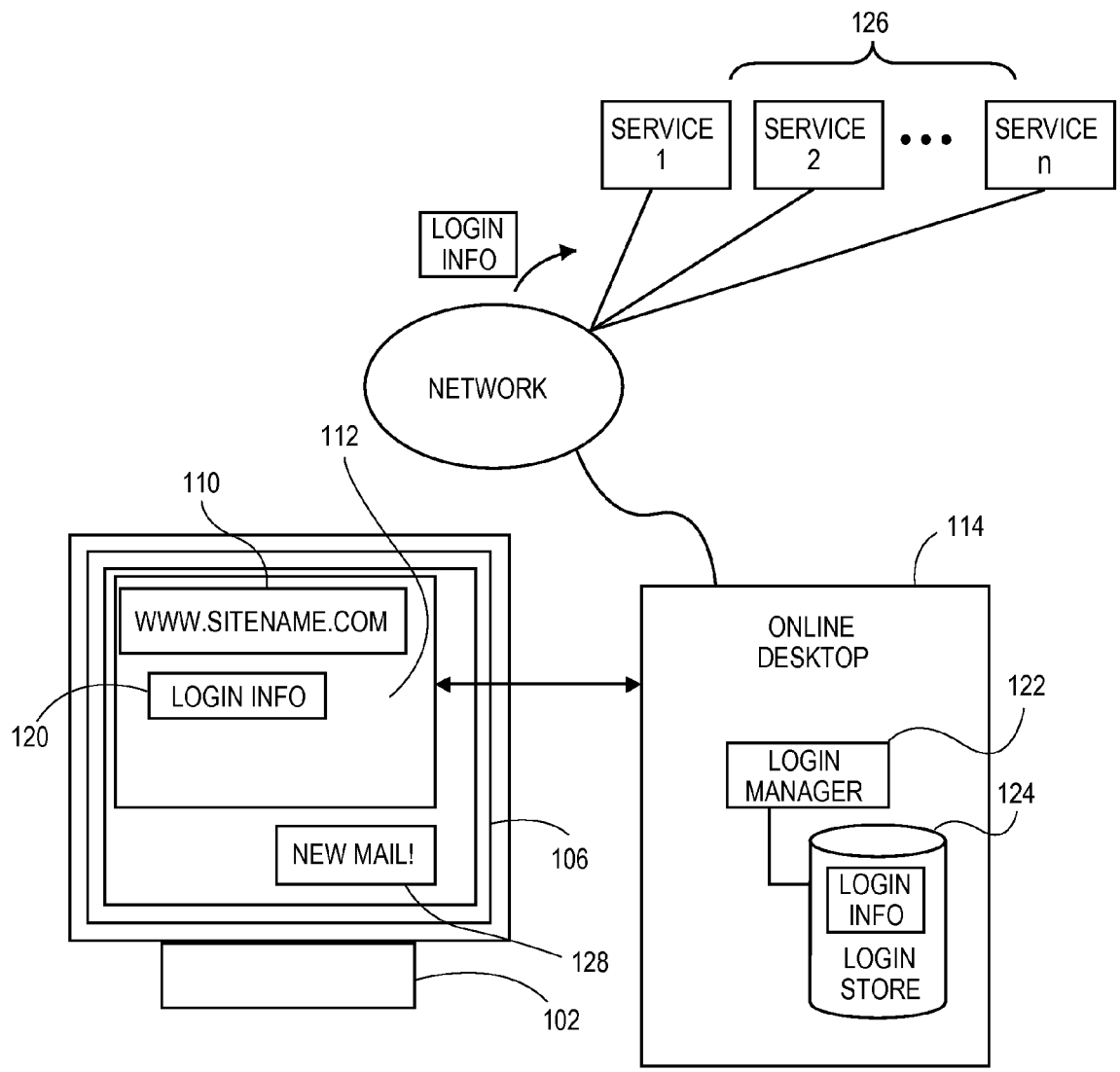
FIG. 2 illustrates an overall system for unified login to multiple programs and/or services, according to various embodiments in another regard.

More particularly, and as illustrated in FIG. 2, in embodiments login manager 122 can operate in conjunction with browser 108 to capture and receive login information 120 entered by the user when the user enters login data for site 112, for example after being prompted for login credentials. Upon detection and receipt of the login information 120, the login manager 122 communicates with one or more local program 128 to transmit login information 120 to that local program, such as a messenger or email application or service Local program 128 can in turn communicate with a set of registered networked services 126 via network 116 to access associated services based on login information 120. According to embodiments, local program 128 can directly transmit or retransmit a portion or all of login information 120 to the set of registered networked services 126 via network 116. In embodiments, login manager 122 can mediate the transmission of some or all of login information to the set of registered networked services 126. The identity of the set of registered services 126 can be stored along with login information in login store 124 located in client 102, or elsewhere. The local program 128 and/or set of registered networked services 126 can be or include a set of services, applications, data, or other resources that are associated with the site 112 initially accessed by the user. For example, site 112 can comprise an email site for which the user entered an email account name and password as login information 120. The local program 128 can comprise a messenger application, such as a text-based messenger program, that communicates with set of networked registered services 126 to support or provide an instant or real-time messenger service operated by or affiliated with the email service provided by the initial site 112. The messenger service can be configured to accept the same account name and password as the email service initially accessed at site 112. Login manager 122 communicates that or other login information 120 to local program 128, which in turn can communicate that information via network 116 to the additional associated site hosting the messenger service, and/or other services in the set of registered networked services 126. The messenger service or other additional service can be automatically logged into and activated on client 102 as a result of the automatic exchange of login information 120 with local program 128 and/or one or more of the set of registered services 126.

In embodiments, the activation of one or more additional services in set of registered networked services 126 can cause local program 128 to display a dialog, dashboard or other input facility on user interface 106 for the one or more activated services the user has been logged into. When a messenger service is logged into and activated via local program 128 and/or login manager 122, for example, local program 128 and/or that remote service can generate or initiate a popup messenger panel including a friends list, input box, and other interface elements to indicate to the user that service has automatically been logged into and activated. When an email account is logged into and activated as part of the integrated login to multiple services, and inbox icon or other notification can be generated by local program 128. Other services and types of notifications are possible.

According to embodiments, the user can continue to remain logged into local program 128 and/or the set of registered networked services 126, even when the user has departed from the initial site 112 that they have logged in through. According to embodiments, the user can be automatically logged out from local program 128 and/or set of registered networked services 126 upon logging out from the initial site 112 that that have logged into. According to embodiments, local program 128 and/or set of registered networked services 126 can be logged out of or deactivated based upon other events, such as the termination of browser 108 or disconnection from network 116. Other techniques for synchronization of local program 128 and/or the set of registered networked services 126 with the user's browser session and/or other login or logout events are possible.

According to embodiments, one or more local program 128 and associated set of registered networked services 126 can be automatically identified and registered in login store 124 stored in online desktop 114. The set of registered networked services 126 can for instance be defined or enumerated by a site 112 having affiliated sites accepting the same or similar login information 120 and transmitted by site 112 to online desktop 114. In further embodiments, the user can select or to identify one or more local programs, sites, and/or their associated services to be added to the set of registered networked services 126 via online desktop 114. In embodiments, local program 128 and/or the set of registered networked services 126 can be defined by independent sites or services configured to accept identical login information 120.

Figure 3:
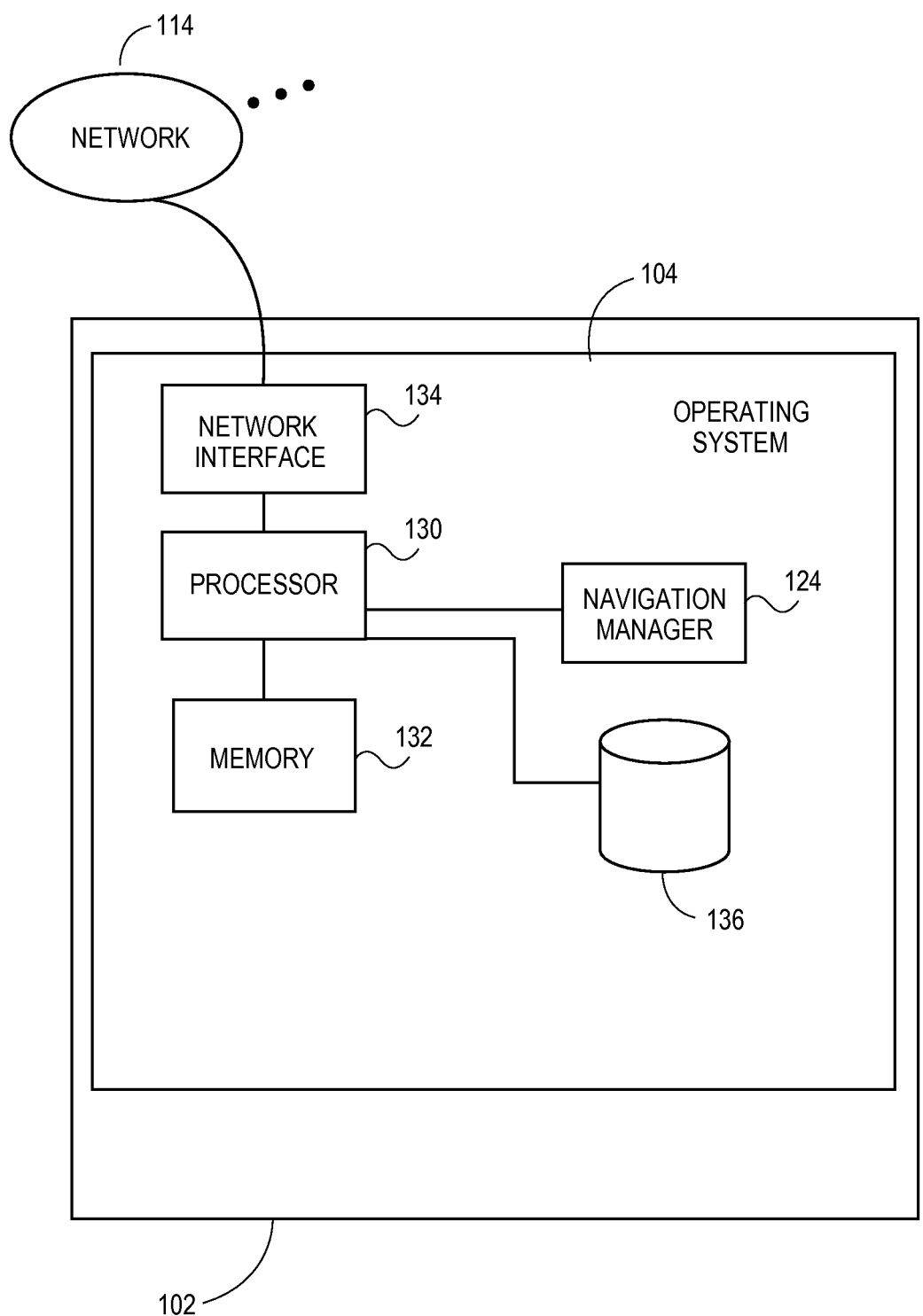
FIG. 3 illustrates an illustrative hardware configuration for a client device that can be used in systems and methods for unified login to multiple programs and/or services, according to various embodiments.

FIG. 3 illustrates an illustrative configuration of hardware including a login manager 122, according to embodiments. In embodiments as shown, client 102 can comprise a processor 130 communicating with memory 132, such as electronic random access memory, operating under control of or in conjunction with operating system 104. Processor 130 also communicates with data store 136, which in turn can store login information 120 and other data. Processor 130 further communicates with navigation manager 124, and with network interface 134. Network interface 134 communicates with network 116 to provide access to one or more site 112, such as Internet or Web sites. Network interface 134 can be or include an Ethernet connection, a wireless data link, or other wired, wireless, or optical channel, link, or connection. Other configurations are possible.

Figure 4:
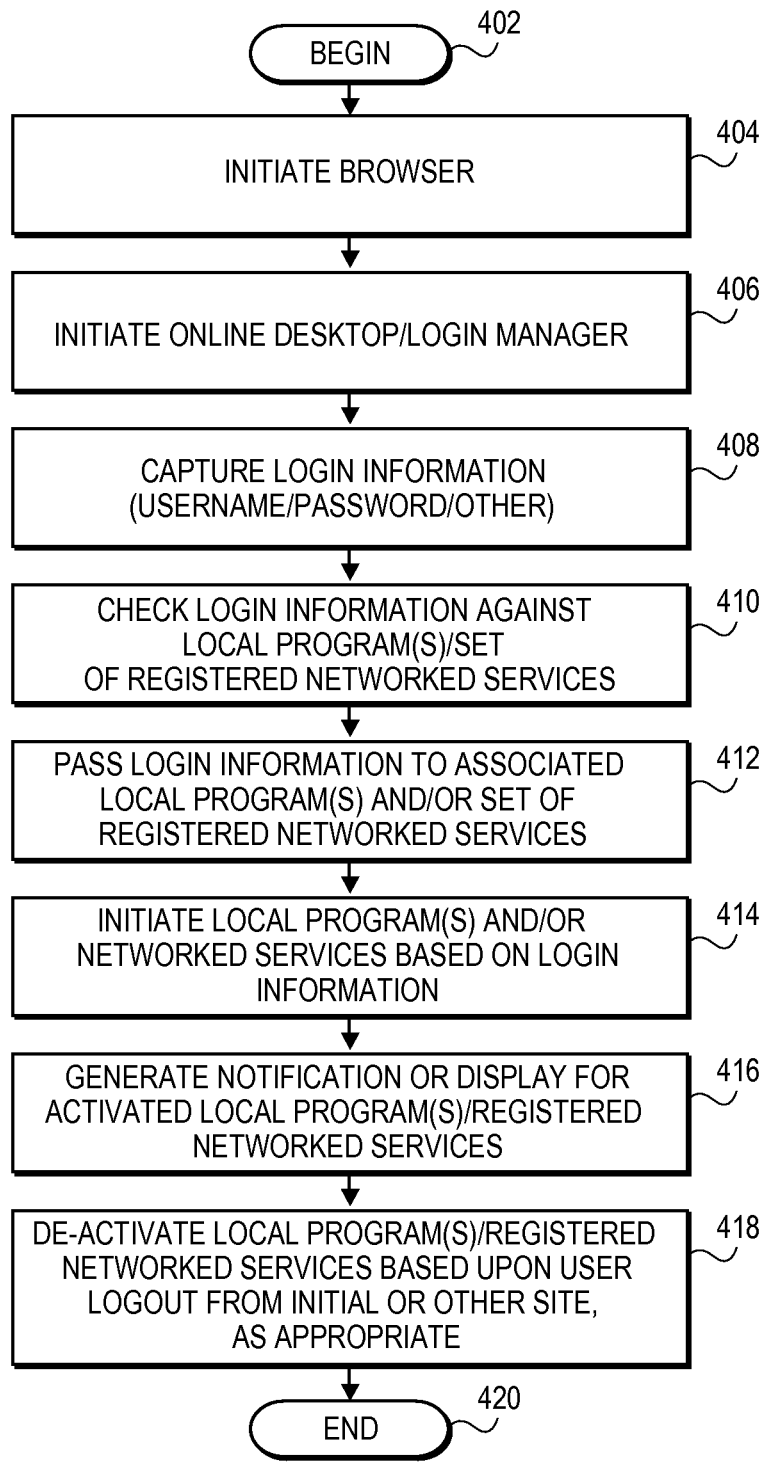
FIG. 4 illustrates a flowchart of overall login processing for unified login to multiple programs and/or services, according to various embodiments.

FIG. 4 illustrates a flowchart of overall login processing for unified login to multiple services, according to embodiments. In step 402, processing can begin. In step 404, a browser 108 can be initiated on client 102. Browser 108 can be, for instance, an open-source browser such as Firefox™ or Opera™, or a proprietary application. In step 406, online desktop 114 and login manager 122 can be activated, for example, automatically in response to initiation of browser 108. In embodiments, login manager 122 can be integrated into online desktop 114, or can be hosted in operating system 104 or elsewhere.

In step 408, login manager 122 can capture login information 120, such as user name, password, account numbers, or other credentials or information, from the user input entered in browser 108. The capture of login information 120 can be transparent to the user's browsing activity. In step 410, login manager 122 can check login information 120 against login store 124 to identify one or more local program 128 and/or associated set of registered networked services 126 associated with login information 120. Local program 128 and/or set of registered networked services 126 can be or include, for example, a set of applications, services or sites that are configured to accept login information 120 to initiate additional programs, utilities and/or services. Local program 128 can be or include, for instance, a messenger application or email program. The set of registered networked services 126 can for instance include an interactive messenger service, a media download service, an RSS or Atom™ syndicated data feed, a social networking service, a calendar or scheduling service, or other service or networked application. In step 412, login manager 122 passes login information 120 to local program 128 and/or the set of registered networked services 126 via network 116, such as the Internet. In embodiments, login information 120 can be encrypted.

In step 414, local program 128 and/or one or more of the various services enumerated in the set of registered networked services 126 can be accessed or initiated. In step 416, a notification, interface or display for local program 128 and/or any activated services in the set of registered networked services 126 can be generated. For example, a messenger dialog box can be displayed showing a user's set of friends in a social networking group, and/or a set of music files available for download or streaming can be presented in association with a media site. In embodiments, the notification, interface or display can be generated or mediated by online desktop 114. In step 418, the local program 128 and/or registered services that have been initiated after capture and sharing of login information 120 can be logged out of or deactivated after the user logs out from site 112, as appropriate. In embodiments, local program 128 and/or any active services can be logged out of or deactivated after the user logs out from or terminates online desktop 114. In further embodiments, logging out or deactivation of local program 128 and/or any registered networked services can be based on other events or inputs. In embodiments, for example, the user can be presented with a list via local program 128 or online desktop 114 to deactivate or log out of local program 128 and/or selected services, with or without logging out from site 112 or taking other action. In step 420, processing can repeat, return to a prior processing point, jump to a further processing point, or end, understood by persons skilled in the art.

The foregoing description is illustrative, and variations in configuration and implementation may occur to persons skilled in the art. For example, while embodiments have been described in which the same login information 120 used to log into site 112 is communicated to local program 128 and/or the set of registered services 126, in embodiments additional or different information from login information 120 can be transmitted to the local program(s) and additional services. For example, login manager 122 can store multiple sets of differing login information to be transmitted to local program 128 and the set of registered services 126, based on or triggered by successful entry of login information 120 at site 112. For further example, while embodiments have been described in which the login information 120 for a single site 112 is used to trigger the automatic login to local program and/or a set of registered services 126, in embodiments, the initiation of login to local program 128 and/or set of registered services 126 can be triggered by the capture of successful login information from multiple separate sites. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
    receiving, in a browser running on a computing device, login information;
    capturing, by a login manager running on an online desktop of the computing device, the login information received in the browser;
    providing, by the login manager, at least a portion of the login information to at least one local program, separate from the browser and the login manager, that is running on the computing device and to at least one of a set of networked services registered to accept the login information and accessible to the computing device over a network; and
    accessing, by a processing device, the at least one local program and the at least one of the set of networked services based on the at least a portion of the login information.

2. The method of claim 1, wherein the login information comprises at least an account name and a password.

3. The method of claim 1, wherein the set of registered networked services comprises at least one of an email service, a messenger service, a social networking service, and a media service.

4. The method of claim 1, wherein the set of registered networked services is stored to a login store in a client.

5. The method of claim 1, wherein the set of registered networked services are accessible via the Internet.

6. The method of claim 1, wherein a user selects services for registration in the set of registered networked services.

7. The method of claim 1, wherein the login information entered in the browser logs a user into a Web site or service.

8. The method of claim 1, wherein the at least one local program and at least one of the registered networked services are logged out of or deactivated upon logout from the Web site or service.

9. The method of claim 1, wherein a service display is automatically generated for the at least one local program and at least one registered networked service on a user interface.

10. A system comprising:
    a browser to receive login information; and a login manager module, communicating with the browser, the login manager module having an online desktop and executable by a computing device to:
- capture the login information entered received in the browser,
- provide at least a portion of the login information to at least one local program, separate from the browser and the login manager, that is running on the computing device registered to accept the login information,
- provide at least a portion of the login information to at least one of a set of networked services registered to accept the login information and accessible to the computing device over a network, and
- access the at least one local program and the at least of the set of networked services based on the at least a portion of the login information.

11. The system of claim 10, wherein the login information comprises at least an account name and a password.

12. The system of claim 10, wherein the set of registered networked services comprises at least one of an email service, a messenger service, a social networking service, and a media service.

13. The system of claim 10, wherein the set of registered networked services is stored to a login store in a client.

14. The system of claim 10, wherein the set of registered networked services are accessible via the Internet.

15. The system of claim 10, wherein a user selects services for registration in the set of registered services.

16. The system of claim 10, wherein the login information entered in the browser logs a user into a Web site or service.

17. The system of claim 10, wherein the at least one local program and the at least one of the registered services are logged out of or deactivated upon logout from the Web site or service.

18. The system of claim 10, wherein a display is automatically generated for the at least one local program and the at least one registered networked service on a user interface.

19. A non-transitory computer-readable storage medium storing instructions, which when executed, cause a processing device to perform operations comprising:
- receiving, in a browser running on a computing device, login information;
- capturing by a login manager running on an online desktop of the computing device, the login information received in the browser;
- providing, by the login manager, at least a portion of the login information to at least one local program, separate from the browser and the login manager, that is running on the computing device and to at least one of a set of networked services registered to accept the login information and accessible to the computing device over a network; and
- accessing, by the processing device, the at least one local program and the at least one of the set of networked services based on the at least a portion of the login information.

20. The non-transitory computer-readable medium of claim 19, wherein the login information comprises at least an account name and a password.

21. The non-transitory computer-readable medium of claim 19, wherein the set of registered networked services comprises at least one of an email service, a messenger service, a social networking service, and a media service.

22. The non-transitory computer-readable medium of claim 19, wherein the set of registered networked services is stored to a login store in a client.

* * * * *